US005733826A

United States Patent [19]
Groitzsch

[11] Patent Number: 5,733,826
[45] Date of Patent: Mar. 31, 1998

[54] INNER SOLE FOR SHOES AND PROCESS FOR ITS MANUFACTURE

[75] Inventor: Dieter Groitzsch, Hirschberg, Germany

[73] Assignee: Firma Carl Freudenberg, Weinheim, Germany

[21] Appl. No.: 675,203

[22] Filed: Jul. 3, 1996

[30] Foreign Application Priority Data

Jul. 15, 1995 [DE] Germany .................. 195 25 858.4

[51] Int. Cl.$^6$ .............. D04H 1/04; D04H 1/58; B32B 31/00; B31F 81/00

[52] U.S. Cl. .............. 442/364; 442/335; 442/405; 442/407; 442/416; 156/84; 156/148; 156/196; 28/107

[58] Field of Search ............... 442/335, 364, 442/405, 407, 416; 28/107; 156/84, 148, 196

[56] References Cited

U.S. PATENT DOCUMENTS

| | | | |
|---|---|---|---|
| 4,500,384 | 2/1985 | Tomioka et al. | 442/364 |
| 4,594,283 | 6/1986 | Ohigashi | 442/268 |
| 4,681,801 | 7/1987 | Eian et al. | 442/364 |
| 4,684,570 | 8/1987 | Malaney | 442/364 |
| 4,999,237 | 3/1991 | Mellors et al. | 442/67 |
| 5,425,987 | 6/1995 | Shawver et al. | 442/364 |

FOREIGN PATENT DOCUMENTS 30 12 114A1  7/1981  Germany.

*Primary Examiner*—Terrel Morris
*Attorney, Agent, or Firm*—Kenyon & Kenyon

[57] ABSTRACT

An insole for shoes is a three-dimensionally shaped laminate composed of two adhesive-free formed fabrics, the formed fabric on the foot side being thin and abrasion-resistant, and the thicker formed fabric forming the base material of the insole consisting of staple fibers, having a composition of 50–60% by weight of core/sheath-polyester/copolyester fibers with a melting range of the core component of 255°–260° C. and of the sheath component of 110°–140° C., 5–15% by weight of high-shrinkage polyester fibers, and 25–40% by weight of absorbent fibers. The base material has a mass per unit area of 800–1200 g/m$^2$ with a thickness of 0.70–0.85 cm. The insole is produced by shrinking the loosely needled base material by means of superheated water vapor, subsequently laminating the base material to an emboss-bonded and heated formed fabric by means of an adhesive compound, deep drawing of the laminate which was first heated above the melting range of the sheath component of the base material fibers inside an unheated molding press, and subsequently punching out the individual deep-drawn molded insoles.

5 Claims, No Drawings

INNER SOLE FOR SHOES AND PROCESS FOR ITS MANUFACTURE

BACKGROUND OF THE INVENTION

1. Field of the Invention

The invention relates to an insole for shoes composed of a needle-punched formed fabric of a staple fiber mixture of mostly polyester fibers and absorbent fibers, and to a method for manufacturing such an insole.

2. Description of Related Art

An insole of this type, which is formed without the presence of an additional adhesive, is known from DE 30 12 114 A1. The objective of this reference is the creation of an insole which is very moisture-absorbent while still retaining high pressure-stability. It is stated that this object is achieved by providing that the base material of the insole is a needle-punched felt consisting of a fiber mixture of 15–25% viscose rayon and 75–85% polyester fibers. Approximately 20% of the polyester fibers are admixed to the base material as shrinkage fibers. Great importance is attached to the avoidance of the use of adhesive material. Nevertheless, the insole manufactured in this manner has a high degree of strength while at the same time being soft and absorbent.

The manufacturing process provides that a nonwoven fabric is produced from viscose rayon and polyester fibers, subsequently carded and then needle-punched, followed by an impregnation process as a bactericidal treatment. Thereupon the finished insole is punched out. Advantageously, the needle-punched felt is shrunk immediately after needle-punching. This needle-punching is performed twice, preferably once from each side.

However, one drawback to this prior art insole is that it does not have any supporting function for the foot. Moreover, it is susceptible to buckling and shifting inside the shoe when walking.

SUMMARY OF THE INVENTION

Accordingly, it is an object of the invention to improve the prior art insole in such a way that, while retaining the capability of absorbing and conducting moisture, a supporting function in the sense of a foot bed is provided. It is a further object of the invention to provide such an insole which, under exertion of energy on the part of the moving foot, retains a sufficient resistance against buckling and shifting inside the shoe, and which also accurately fits the interior shape of the shoe.

These and other objects of the invention are achieved by providing an insole laminate for shoes. The laminate includes a formed fabric base material formed by a needle-punched formed fabric. The formed fabric is composed of: 50–60% by weight of fibers having a copolyester sheath component and a polyethylene terephthalate core component, the sheath component having a melting temperature in a range of 110°–140° C., and the core component having a melting temperature in a range of 255°–260° C.; 5–10% by weight of polyester high-shrinkage fibers; and 25–40% by weight of absorbent fibers. The formed fabric base material has a mass per unit area of 800–1200 g/m² and a thickness of 0.70–0.85 cm. The formed fabric base material is free of adhesive.

An adhesive-free, abrasion-resistant and emboss-bonded formed fabric is laminated on a foot-facing side of the base material by an adhesive compound. This formed fabric has a thickness which is at least ⅓ less than the thickness of the formed fabric base material. The insole laminate of the two formed fabrics is three-dimensionally shaped.

DETAILED DESCRIPTION OF THE INVENTION

The insole of the invention can be produced as follows. A non-woven fabric is carded from the mixture of staple fibers forming the base material and subsequently needle-punched. The needle punching of the non-woven fabric is performed mechanically and only once from one of its surfaces. The needle-punched formed fabric is shrunk, without contact, in a stream of superheated water vapor to form the base material.

Subsequently the emboss-bonded formed fabric forming the cover on the foot side is heated to a temperature 20°–40° C. above the softening range of an adhesive applied on the cover. Next, the unheated base material consisting of the needle-punched and shrunken formed fabric is placed onto the adhesive-covered side of the cover and laminated between unheated rolls. During the next step of the process, the laminate is heated to a temperature which ensures that the sheath component of the fibers of the base material arrives in a softened, adhesive state at the form tool.

The form tool is designed as a deep-drawing molding press wherein several hollow cavities are provided corresponding to the three-dimensional shape of the insole pairs and which are enclosed by corresponding molding surfaces. During an interval of 6–8 seconds the laminate is allowed to cool down in the closed and unheated mold. The mold is then opened, the deep-drawn laminate is taken out and then the formed insole pairs are punched out.

In the case of the invention as in the prior art, the absence in the insole of any additional adhesive in the fibrous composite structure is important for wearing comfort, especially for water vapor permeability as well as the absorption and evaporation of water vapor.

For this purpose, the invention provides that the formed fabric forming the base material is made up of a staple fiber mixture of the following composition: 50–60% by weight are fibers of the core/sheath type having a melting range of the copolyester sheath component of 110°–140° C. and of the polyethylene terephthalate core component of 255°–260° C.; that 5–15% by weight are polyester high-shrinkage fibers; and 25–40% by weight are absorbent [bibulous] fibers.

The specified core/sheath fibers are commercially available. The copolyester of the sheath component is usually formed from polycondensation products of dicarboxylic acids as, e.g., terephtalic acid, isophtalic acid or adipic acid, with diol components as, e.g., polyethylene glycol, butylene glycol or hexamethylene glycol.

The polyester high-shrinkage fibers are likewise commercially available and usually consist of shrinkable polyethylene terephthalate.

As absorbent fibers, preferably viscose rayon, lyocell, wool or cotton are used.

This base material has a mass per unit area of 800–1200 g/m² with a thickness of 0.70–0.85 cm. These values pertain to a state in which the high-shrinkage fibers are already in a shrunken condition.

The side of this formed fabric forming the base material, and which, later on, will face the foot is laminated with another adhesive-free, abrasion-resistant and emboss-bonded formed fabric. The inner cohesion of the fibers of the latter formed fabric is also realized solely by autogenous welding together of the fibers, and not by a separate adhesive or binder, so that the ability to absorb and pass on moisture is retained by this fabric as well.

This formed fabric cover is thinner by at least one fifth than the formed fabric of the base material. Expediently it consists exclusively of bicomponent fibers, either of the same type which is found in the base material, or of the fiber components polyamide 6,6/polyamide 6 or polyester/copolyester. In any case, however, this formed fabric cover consists of staple fibers and spinning filaments.

According to the invention, the described laminate is shaped three-dimensionally. Thus, in conformance with the initial aim, it is guaranteed that the insole, at the non-horizontal interior regions of the shoe, supports itself and will remain firmly in its position even when the shoe is worn. The danger of buckling due to longitudinal movements of the foot is likewise excluded because of the refinement according to the invention.

For the purpose of odor absorption it is advantageous if the abrasion-resistant formed fabric cover contains odor-absorbent components as, e.g., activated charcoal particles or fibers, or zeolites on the side facing the base material.

Of course it is possible to equip the base material as well as the non-woven cover material, or only one of them, with a bactericidal agent as described in DE 30 12 114 A1.

The manufacture of the insole of the invention depends on the required working properties, the materials used in accordance with the invention as well as the economic efficiency of the process.

A mixture of staple fibers, consisting of: 50–60% by weight of core/sheath fibers having a melting range of the copolyester sheath component of 110°–140° C., and of the polyethylene terephthalate core component of 255°–260° C.; 5–15% by weight of polyester high-shrinkage fibers; and 25–40% by weight absorbent fibers is formed into a non-woven fabric by means of carding. This non-woven fabric is subsequently mechanically needle-punched one time from one of its surfaces in order to improve the cohesion of the fibers. Such a degree of needle-punching, which is only slight, guarantees sufficient thickness of the formed fabric and permits the later strong shrinkage since, during this subsequent process, the high-shrinkage fibers experience only slight mechanical obstruction due to the adjacent fibers; the individual fibers are able to slide along each other easily.

Now follows the shrinking process, wherein the polyester high-shrinkage fibers of the formed fabric are exposed contact-free to a stream of superheated water vapor. This is most advantageously done in a so-called shrinkage boot. The formed fabric, in a free fall, passes through a zone filled with superheated water vapor, is plaited down after hitting the floor of the device, i.e., it is folded in a loose, staggered fold and subsequently rolled. The free fall rules out to a great extent any obstacle to the shrinking process, e.g., because of an interfering support, etc.

As a cover provided for the foot side, a prefabricated, abrasion-resistant and emboss-bonded formed fabric is used whose fiber cohesion is effected without any adhesives, and solely by the internal welding of the fibers contained therein as well as by the embossing process. The type of fibers suited for this have been enumerated above.

This formed fabric, which is thinner by one fifth than the shrunken base material, is provided with an adhesive compound powder coating on the surface to be bonded to the base material. In the interest of superior air and moisture permeability, this coating can also be applied in a certain pattern. Thereupon the formed fabric cover is heated by means of a heat radiator to a temperature at which the adhesive compound becomes capable of sintering. Suitably this means 20°–40° C. above the softening range of the adhesive compound.

The heated formed fabric is now placed on the unheated base material, whereupon, directly following, both formed fabrics are bonded together between unheated rollers with the help of the sintered-on and cooling adhesive compound.

The laminate thus created is thereupon shaped three-dimensionally. This process is performed in an unheated, deep-drawing compression molding die. The die can receive sheets of the laminate and contains several mold cavities which correspond to the shape of the insole pairs to be manufactured. These mold cavities are enclosed by metal mold surfaces which are not heatable. Suitably, a molding press is selected with which a great number of insole pairs can be deep-drawn simultaneously on a laminate sheet.

After its manufacture, the formed fabric laminate is then shaped to form sheets corresponding to the receiving space of the deep-drawing die. Each of these sheets is thereupon heated up in a preheating zone to a temperature at which it is ensured that the sheath component reaches the form tool in a softened, adhesive state. The exact temperatures necessary for heating can be determined very easily if the melting range of the sheath component of the core/sheath fibers and the distance between the preheating zone and the form tool are known.

The laminate thus heated is now placed into the unheated form tool and the form tool is closed. After 6–8 seconds of dwelling time, the deep-drawing process is completed and the laminate has cooled down sufficiently so that after opening the form, the insole pairs are durably molded into the laminate.

Next comes the punching out of the individual insole pairs.

Where the insoles are meant to contain odor-absorbing components, especially if particles are used, they are deposited on the thin formed fabric cover on the side facing away from the foot before its bonding to the base material. Said particles can be admixed to the adhesive compound used for laminating, or fastened to the thin formed fabric by means of said adhesive compound. If active charcoal fibers are used, it is possible to apply them in a layer on the side of the formed fabric cover facing away from the foot by means of an adhesive compound, and subsequently to perform the lamination of the formed fabric cover to the base material by means of a second application of adhesive compound. An impregnation with bactericidal substances, as disclosed in DE 30 12 114 A1, can be performed at any stage of the process according to the invention, namely before lamination, after production of the laminate, after deep-drawing or on the finished insole pairs. The selection will be made solely in accordance with local circumstances, taking into consideration the greatest possible economic efficiency and the requirement of impeding the manufacturing process as little as possible.

What is claimed is:

1. An insole laminate for shoes comprising:
a formed fabric base material formed by a needle-punched formed fabric composed of 50–60% by weight of fibers having a copolyester sheath component and a polyethylene terephthalate core component, the sheath component having a melting temperature in a range of 110°–140° C., and the core component having a melting temperature in a range of 255°–260° C., 5–10% by weight of shrunken polyester fibers and 25–40% by weight of absorbent fibers, the formed fabric base material having a mass per unit area of 800–1200 g/m² and a thickness of 0.70–0.85 cm, and said formed fabric base material being free of adhesive; and an adhesive-free, abrasion-resistant and emboss-bonded formed fabric laminated on a foot-facing side of the base material by an adhesive compound, said formed fabric having a thickness which is at least ⅓ less than the thickness of the formed fabric base material, wherein the insole laminate of the two formed fabrics is three-dimensionally shaped.

2. The insole according to claim 1, wherein the absorbent fibers are selected from the group consisting of fibers of viscose rayon, lyocell, wool and cotton.

3. The insole according to claim 1, wherein the abrasion-resistant, formed fabric which is laminated on the base material contains odor-absorbent components on a side thereof which faces the base material.

4. The insole according to claim 2, wherein the abrasion-resistant, formed fabric which is laminated on the base material contains odor-absorbent components on a side thereof which faces the base material.

5. A process for manufacturing the insole laminate for shoes of claim 1, comprising the steps of: carding a non-woven fabric from a mixture of the fibers which comprise the base material; subsequently needle punching the nonwoven fabric mechanically and only once from one of its surfaces; shrinking the needle-punched formed fabric, without contact, in a stream of superheated water vapor to form the base material; subsequently heating the emboss-bonded formed fabric forming a cover on the foot side to a temperature 20°–40° C. above the softening range of an adhesive applied on said cover; placing the unheated base material comprised of the needle-punched and shrunken formed fabric onto the adhesive-covered side of said cover and laminating the base material between unheated rolls; heating the laminate to a temperature so that the sheath component of the fibers of the base material is in a softened, adhesive state; placing the laminate in said softened, adhesive state in a form tool which is designed as a deep-drawing molding press having hollow cavities corresponding to the three-dimensional shape of the insole and which are enclosed by corresponding molding surfaces; allowing the laminate to cool in the mold which is closed and unheated during an interval of 6–8 seconds; removing the deep-drawn laminate from the mold; and punching out a formed insole.

\* \* \* \* \*